Dec. 16, 1969 J. SCHIFFERS ET AL 3,483,902

MEANS FOR SECURING A SAW BLADE TO A SAW SHAFT

Filed Sept. 18, 1967

INVENTOR.
Josef Schiffers et Al

BY

Attorneys

United States Patent Office 3,483,902

Patented Dec. 16, 1969

1

3,483,902

MEANS FOR SECURING A SAW BLADE TO A SAW SHAFT

Josef Schiffers, Rheindahlen, and Willi Benz, Neuss, Germany, assignors to Schloemann Aktiengesellschaft, Dusseldorf, Germany, a German company Filed Sept. 18, 1967, Ser. No. 668,615

Claims priority, application Germany, Sept. 27, 1966, Sch 39,586

Int. Cl. B27b 5/32

U.S. Cl. 143—155 3 Claims

ABSTRACT OF THE DISCLOSURE

Means for non-rotatably and non-slidably securing, upon a saw shaft, a unit consisting of a saw blade and its hub, comprising: spring pressed holding means, removable after the spring pressure has been overcome.

The securing means preferably comprises a holding rod extending axially through the saw shaft, which is hollow, a removable abutment at one end of the holding shaft, pre-stressed cup springs arranged between the other end of the saw shaft and a nut at the end of the holding rod, and a power appliance, such as a piston-and-cylinder unit operated by fluid pressure, for overcoming the force of the cup springs. A bayonet joint may be provided at one end of the holding rod.

This invention relates to a device for securing a saw blade both non-rotatably and undisplaceably to a saw shaft.

With known saws a hub carrying the saw blade is slid on to the saw shaft, which is provided with fitting keys. By means of a nut screwed on to a thread located at the end of the saw shaft, the hub with the saw blade is secured against axial displacement. One disadvantage of this method of securing resides in the fact that the tightening and loosening of the nut with a spanner takes a comparatively long time. The saw-blade hub must moreover be withdrawn by hand from its seat on the part of the shaft provided with fitting keys before the crane can carry away the saw-blade unit.

The aim of the present invention is to provide means for securing a unit consisting of a saw blade and a hub upon the saw shaft, whilst permitting of a quick changing of the saw blade, manual labour being largely excluded.

According to the invention this aim is attained by means of a spring-pressed holding device, which is removable from its operative region after the spring pressure has been overcome.

In a further development of the invention there is provided, as the holding means, a holding rod which is passed axially through the hollow saw shaft, and at the end of which adjacent to the saw-blade an abutment is provided, which can be rocked out of the way of the saw-blade hub, whilst at the end of the holding rod issuing from the other end of the hollow shaft, between the end face of the saw shaft and a nut arranged at the end of the holding rod, a set of initially stressed cup or disc springs arranged at the end of the holding rod is accommodated. With the holding rod is associated a power appliance, opposing the force of the springs. In this way a securing device is provided which can be quickly and reliably operated.

According to a further feature of the invention the saw-blade hub is provided, on the end face, with a bayonet aperture, with which is associated an abutment, rotatably mounted on the holding rod, and constructed as a bayonet body, the surfaces of the abutment and of the saw-blade hub that transmit the holding force being provided with interengaging projections and recesses.

2

The manual labour required with the known appliances can thus be replaced by the power appliance. As a power appliance there may advantageously be provided a pressure-fluid cylinder located at the cup-spring end of the saw shaft, the piston rod of a piston sliding in this cylinder being directed towards the end face of the holding rod.

The holding rod is provided, in the region of the saw-blade hub, with a collar, on the inner side of its constriction, which is provided with a bayonet aperture, and this collar overlaps the bayonet aperture. The manual labour hitherto required for drawing the saw-blade hub off its seat can thus be replaced by actuating the power appliance.

One embodiment of the invention is illustrated by way of example in the accompanying drawings, in which.

Figures 1, 2, 3:
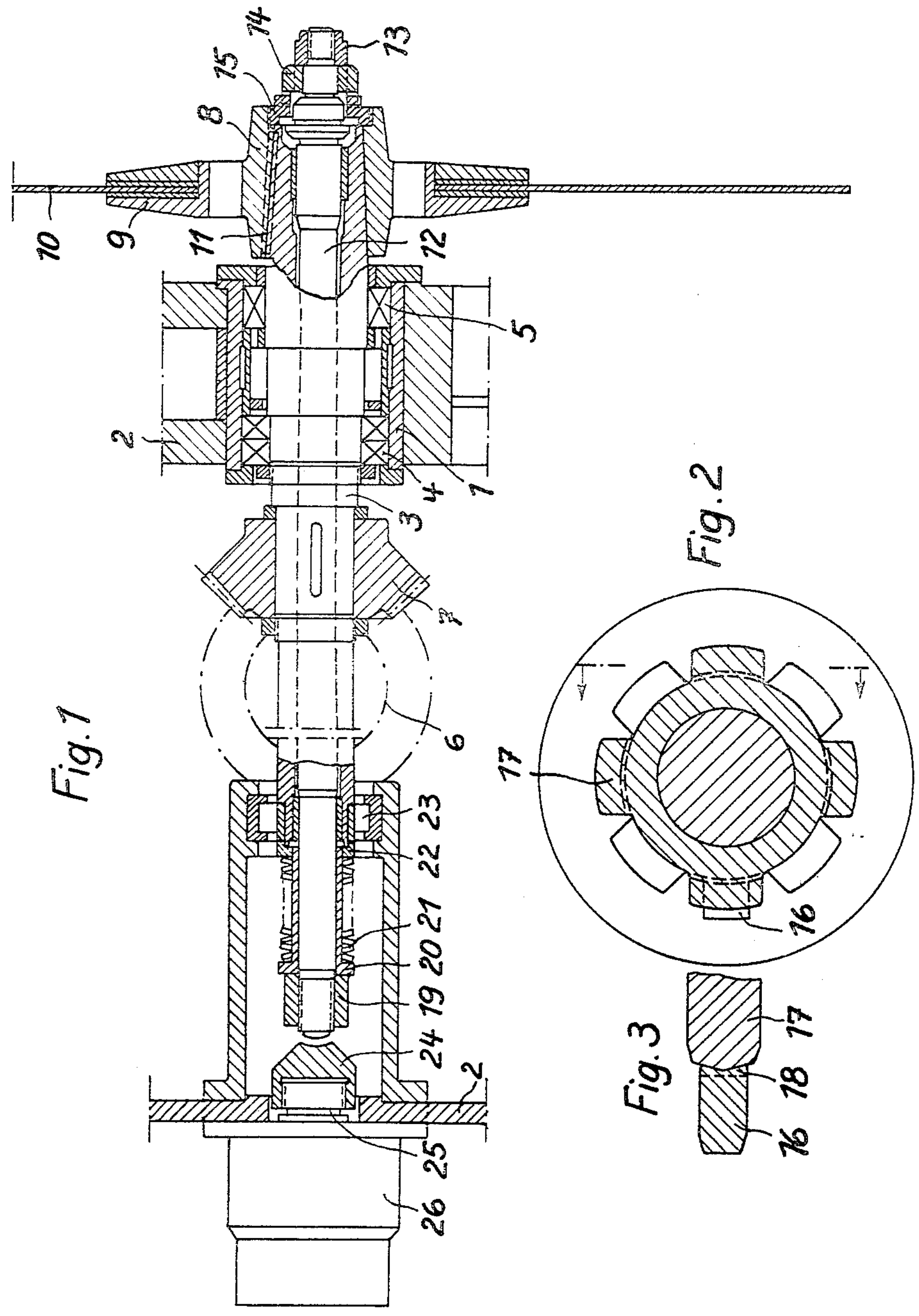
FIGURE 1 shows the saw shaft, with the securing means for the saw-blade hub.
FIGURE 2 shows a partial section through the bayonet body.
FIGURE 3 shows a partial section of FIGURE 2.

In a bearing housing 1 of a saw frame 2, a hollow saw shaft 3 is supported upon ball or roller bearings 4 and 5. The saw shaft 3 is connected, by way of bevel wheels 6 and 7, and a driving shaft, not shown, journalled perpendicularly to it, with a motor, likewise not shown.

On to a conically constructed end of the saw shaft 3 is slipped a saw-blade hub 8, upon the flange 9 of which is secured a saw blade 10. To prevent relative rotation, a fitting key 11 is accommodated in the saw shaft 3.

Through the axial aperture of the hollow saw shaft 3 is passed a holding rod 12, upon that end of which that issues from the saw shaft 3 is rotatably supported a bayonet body 14, held by a nut 13. Into the end face of the saw-blade hub 8 is screwed a ring 15, the internal aperture of which is constructed correspondingly to the profile of the bayonet body 14.

In the holding position, the adjacent end faces 16 and 17 of the bayonet body 14 and of ring 15 respectively bear upon one another. In order that they may not undergo any unwanted displacement relative to one another, these faces are provided with cogged surfaces 18.

Upon that end of the holding rod 12 that projects in the opposite direction from the saw shaft 3 is accommodated a sleeve 20, secured by a nut 19. On to this sleeve is slipped a pre-stressed set of cup springs 21, which is supported by way of the inner race ring 22 of a ball or roller bearing 23 on the end face of the saw shaft 3.

Towards the end of the holding rod 12 is directed the piston rod 25, provided with a shoe 24, of a fluid-pressure cylinder 26, which is flanged to the shear frame 2.

When the hub 8, with the saw blade 10, is to be removed from the saw shaft 3 and replaced by a fresh unit, pressure fluid is admitted to the cylinder 26, whereby the holding rod 12 is moved to the right. The cogging 18 of the holding surfaces 16 and 17 thereby firstly comes out of engagement, so that the bayonet body 14 can be rotated, relatively to the ring 15, into the through-pass position. Upon further movement of the holding rod 12, a collar located thereon comes into contact with the inner side of the ring 15, as a result of which the hub 8 can be pushed off its seat on the saw shaft 3.

We claim:

1. Means for non-rotatably and non-slidably securing, upon one end of a hollow shaft journaled in a saw frame, a unit consisting of a saw blade and its hub, comprising: a holding rod extending axially through the interior of the saw shaft, an abutment, constructed as a bayonet body, rotatably mounted upon that end of the holding rod which projects from that end of the saw-blade shaft upon which the blade is mounted, the outer face of the saw-blade hub and the adjacent face of the said abutment being formed with projections and recesses adapted to engage with one another to form a bayonet joint, spring means tending to keep the bayonet joint closed, and a power appliance for overcoming the force of the spring means, to enable the bayonet joint to be opened.

2. Means as claimed in claim 1 for non-rotatably and non-slidably securing a unit consisting of a saw blade and its hub upon a saw shaft, further comprising: a nut screwed on to the end of the holding rod remote from the saw blade, the said spring means consisting of a set of pre-stressed cup springs interposed between the said nut and the end face of the saw shaft remote from the saw blade.

3. Means as claimed in claim 1 for non-rotatably and non-slidably securing a unit consisting of a saw blade and its hub upon a saw shaft, the said power appliance consisting of a pressure-fluid cylinder secured to the saw frame at the end remote from the saw, and a piston-and-piston-rod unit slidable in the said cylinder and adapted to exert an axial thrust against the holding rod.

References Cited

UNITED STATES PATENTS

| | | | |
|---|---|---|---|
| 951,619 | 3/1910 | Rawson | 143—155 |
| 3,118,345 | 1/1964 | Bullard et al. | 90—11 X |
| 3,177,775 | 4/1965 | Alisauskis | 90—11 X |

DONALD R. SCHRAN, Primary Examiner

JAMES F. COAN, Assistant Examiner

U.S. Cl. X.R.

51—168; 83—666; 90—11